(12) United States Patent
Dumitru et al.

(10) Patent No.: US 8,108,399 B2
(45) Date of Patent: Jan. 31, 2012

(54) FILTERING OF MULTI ATTRIBUTE DATA VIA ON-DEMAND INDEXING

(75) Inventors: Marius Dumitru, Sammamish, WA (US); Eric DeVerne Jacobsen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 11/750,754

(22) Filed: May 18, 2007

(65) Prior Publication Data

US 2008/0288524 A1  Nov. 20, 2008

(51) Int. Cl.
*G06F 7/00* (2006.01)
(52) U.S. Cl. ...................................... 707/741; 707/754
(58) Field of Classification Search ................. 455/456, 455/411; 707/3, 101, 100, 102, 200, 227, 707/600, 741, 747, 759, 999.005, 999.006; 347/171; 396/27
See application file for complete search history.

(56) References Cited

U.S. PATENT DOCUMENTS

| | | | |
|---|---|---|---|
| 6,353,438 B1 | 3/2002 | Van Hook | |
| 6,381,605 B1 | 4/2002 | Kothuri | |
| 6,427,145 B1 | 7/2002 | Hara et al. | |
| 6,493,718 B1 | 12/2002 | Petculescu | |
| 6,601,062 B1 | 7/2003 | Deshpande | |
| 6,629,102 B1 | 9/2003 | Malloy | |
| 7,117,218 B2 | 10/2006 | Tkachuk | |
| 7,127,467 B2 | 10/2006 | Yalamanchi et al. | |
| 7,165,065 B1 | 1/2007 | Welton | |
| 7,761,407 B1 * | 7/2010 | Stern | 707/602 |
| 2002/0103793 A1 * | 8/2002 | Koller et al. | 707/3 |
| 2002/0138460 A1 * | 9/2002 | Cochrane et al. | 707/1 |
| 2003/0093408 A1 * | 5/2003 | Brown et al. | 707/2 |
| 2005/0060325 A1 | 3/2005 | Bakalash | |
| 2005/0065910 A1 * | 3/2005 | Welton et al. | 707/2 |
| 2006/0271568 A1 | 11/2006 | Balkir | |
| 2007/0208721 A1 * | 9/2007 | Zaman et al. | 707/4 |
| 2008/0195577 A1 * | 8/2008 | Fan et al. | 707/2 |

OTHER PUBLICATIONS

Haritsa, Jayant R. and S. Seshadri, "Real-Time Index Concurrency Control," IEEE Transactions on Knowledge and Data Engineering, May/Jun. 2000, vol. 12, No. 3, published online at [http://eprints.iisc.ernet.in/1101/1/index.pdf], retrieved on Mar. 21, 2007.

Chaudhuri, Surajit and Vivek Narasayya, "An Efficient Cost-Driven Index Selection Tool for Microsoft SQL Server," Proceedings of the 23rd VLDB Conference Athens, Greece, 1997, published online at [http://wwwiti.cs.uni-magdeburg.de/~eike/selftuning/sources/efficient_cost_driven_index_selection.pdf], retrieved on Mar. 21, 2007.

Gupta, Himanshu, et al. "Index Selection for OLAP," published online at [https://eprints.kfupm.edu.sa/45688/1/45688.pdf], retrieved on Mar. 21, 2007.

Dehne, Frank, et al, "Parallel Multi-Dimensional ROLAP Indexing," 2004, Kluwer Academic Publishers, published online at [http://users.cs.dal.ca/~arc/publications/1-25/paper.pdf], retrieved on Mar. 21, 2007.

(Continued)

*Primary Examiner* — Vei-Chung Liang
(74) *Attorney, Agent, or Firm* — Workman Nydegger

(57) ABSTRACT

Systems and methods that employ auxiliary data structures in form of indexes (e.g., slice indexes) to process incoming queries in query retrieval systems (e.g., Online Analytical Processing (OLAP) environments.) The indexing component analyzes attributes involved in predicate conditions of filter requests to form slice indexes for same filtering criteria, wherein resulting data set share the same filtering criteria in form of attributes. The indexes of the subject innovation can be created on-the-fly, and typically without intervention by system administrators.

19 Claims, 10 Drawing Sheets

OTHER PUBLICATIONS

Gray, Jim and Andreas Reuter, "Transaction Processing: Concepts and Techniques," 1993, Morgan Kaufmann Publishers, San Francisco, California.

International Search Report mailed Jan. 29, 2009, for PCT Application Serial No. PCT/US2008/063322, 11 Pages.

* cited by examiner

FILTERING OF MULTI ATTRIBUTE DATA VIA ON-DEMAND INDEXING

BACKGROUND

Data warehouses typically store substantial quantities of information, and further strive to facilitate expeditious querying and efficient retrieval of such stored data. In general, a data warehouse is a nonvolatile repository that can store a substantial amount of data, such as historical and/or current information—wherein the historical data can correspond to past transactional or operational information.

Accordingly, data warehousing and associated processing mechanisms (e.g., On-Line Analytical Processing (OLAP), Relational OLAP (ROLAP), Multidimensional OLAP (MOLAP), and Hybrid OLAP (HOLAP)) are widespread technologies employed to support business decisions and data analysis. Data warehouses are populated at regular intervals with data from one or more heterogeneous data sources, for example from multiple transactional or enterprise resource planning (ERP) systems. The aggregation of data can provide a consolidated view of an organization from which valuable information are derived.

Moreover, databases associated with such systems can organize and store data in a plurality of multidimensional tables, wherein the tables contain a series of rows (e.g., also referred to as records.) Each row provides particular information about a particular item such as a customer. Rows can further be divided into sections called columns. The intersection between a row and column is typically referred to as a field. Moreover, each field provides data or information related to a particular item. The columns specify the particular type of data provided in each field. For example, a table can be established for purchases of a particular product. Such table can include a plurality of rows corresponding to individual customers, and several columns for first name, last name, address, state, zip code, number of products purchased, price, date, and the like.

Database engines or management systems provide systems and mechanisms to retrieve and manipulate data from database tables upon specification of a query by a user. For example, OLAP describes category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things.

Multidimensional databases and other databases modeled as multidimensional employ a multidimensional query language such as MDX (MultiDimensional eXpressions) to retrieve and interact with data. More specifically, data can be retrieved utilizing the query language to define or describe specifically the data to be retrieved, for example employing select, where and from clauses. Subsequently, an execution engine receives the query definition and returns the requested data.

Typically, queries are processed in an operator tree, wherein data flows through such operator tree to calculate an answer for the query. Accordingly, queries against data warehouse and/or decision support systems commonly become complex, and hence require prolonged processing time for a vast amount of data. Moreover, the earlier that non-qualifying data are eliminated in such processes, the more efficient the complex queries can be executed.

In such schemas, a plurality of large fact tables (e.g., sales details) can be connected with multiple dimension tables (e.g., product information, sales region, and the like). Typical queries against such schemas consist of multiple joins of the fact table with several dimension tables. Moreover, the response time for these queries can become time consuming—e.g., measured in minutes or even hours, due to their intricate characteristics. Such prolonged execution time frames can diminish efficient utilization for the data warehouse applications, and result in an overall poor operation of the warehouse system (e.g., business operations are devalued as time is squandered.)

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that automatically construct ad hoc indexes for cached data sets and query results in a query retrieval system (e.g., an OLAP environment) via an indexing component. The indexes can represent auxiliary data structures and predicates, wherein for each combination of attributes, a list or record identifications can be represented as a slice index. The indexing component can analyzes attributes involved in predicate conditions of filter requests, which are issued on the cached dataset, to form slice indexes for same or similar filtering criteria (e.g., resulting data set share the same filtering criteria in form of attributes such as data, product name, and the like).

Accordingly, overall efficiency for queries that require multiple filtering operations on a large dataset is improved, (e.g., improved speed of data filtering/selection and decreased memory usage for the cache system.) Moreover, system resources such as memory capabilities can be efficiently employed to provide system access for a wider group of audience (e.g., busy executives), wherein the indexes are created on the fly (e.g., typically without intervention by system administrators), and while users await obtaining results for submitted queries. The indexing component can further flush the created index data structures and/or resulting data sets from the cache based on usage patterns and memory availability. The indexes can also be stored in the memory in accordance with a plurality of compression methods (e.g., delta compression, or bitwise Elias Gamma or Golomb encoding).

In a related aspect, the indexing component can be associated with a matching component that matches filtering criteria to an already constructed index data structure. The matching component examines the already constructed slice indexes (e.g., currently existing slice indexes), and determines the best match for the filtering criteria. If such match is not available, an indexing slice for the filter can then be created, wherein when filtering requests involve multiple candidate keys, then indexes can be built on-demand to satisfy the requests (e.g., up to a limit based on heuristics involving cardinality estimates and available memory.)

Accordingly, each of the slice indexes can be associated with a particular filtering criteria and a particular selection predicate. Each slice index can then be optimized for filtering by a particular set of attributes in the indexing space (e.g., dates, products, or a combination of multiple attributes).

Moreover, the indexing component can implement various cost estimation processes for index creation in the OLAP environment. For example, when using an ad hoc index for filtering by multiple values, if the number of filter predicate conditions is small compared to the number of distinct hash index keys, then the predicate condition values are considered one by one, and each value is used to look up and return corresponding index entries matching the value.

In a related methodology, the query processor can initially transform end user customer request to simpler request for storage engine cube data, such as breaking a large query into a plurality of sub cube queries in an OLAP environment. As such, a query is broken up to a plurality of primitive sub requests, to obtain associated data from the storage layer. Subsequently a cache lookup and a check for a slice index that matches or covers the query is performed, wherein if an index is available it will be used to derive a final result from existing cache elements; and if not available, such index can be created. Accordingly, when resulting data request have a matching filtering criteria in common set, the data can be sliced by same filtering criteria. Hence, when similar queries subsequently appear, the index structure can facilitate retrieval of required data (e.g., from existing cache), and mitigate a requirement to store redundant data, such as storing the subset of data.

According to a further aspect, heuristic criteria can be employed to decide when an index should be built. Such decision can be based on data cardinality statistics and number of filter requests issued on a given dataset with filter predicates based on the same candidate key attributes. Moreover, the decision of building an index for a dataset can be performed by the MultiDimensional eXpressions (MDX) Query Processor and Query Optimizer, e.g., when they can infer and have advance knowledge that executing a given MDX query will require multiple filtering operations to be made on the same dataset with predicates based on the same or similar candidate key criteria. Moreover, the indexes can be generated based on anticipation of how an upcoming query is expected to be formed.

In addition, the slice index can be viewed as recognizing an inner join operation, and cost estimation is performed to determine a strategy for performing an inner join, and/or outer join for cost estimation. For example, a hash index can be created that employs "external chaining" instead of the more common "open addressing" technique, in order to cope well with duplicate keys, without performance degradation.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
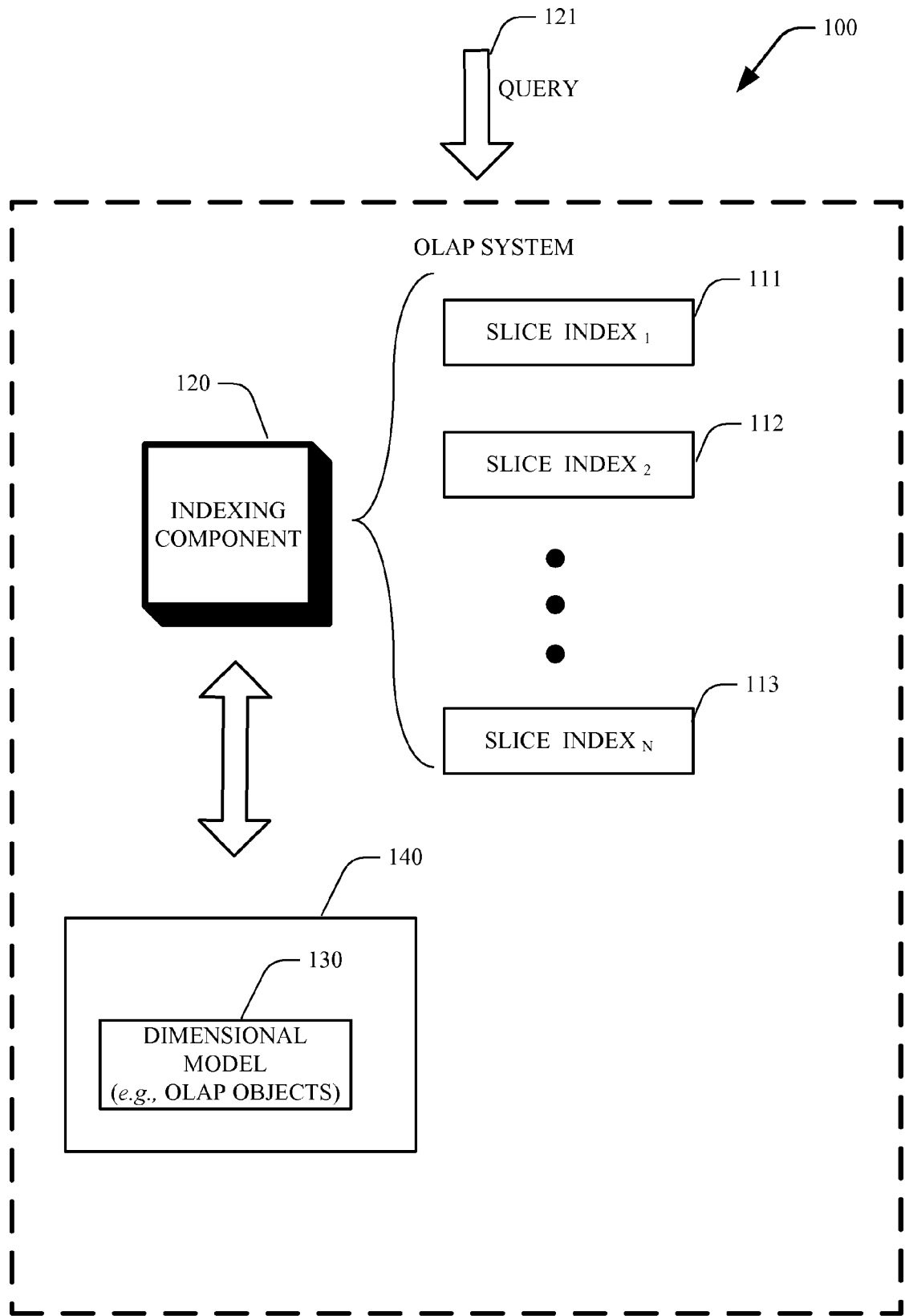
FIG. 1 illustrates a block diagram of an Online Analytical Processing System (OLAP) with an indexing component, which automatically constructs ad hoc indexes for cached data sets and query results, in accordance with an aspect of the subject innovation.

FIG. 1 illustrates a block diagram of an OLAP system 100 that employs an indexing component 120 in accordance with an aspect of the subject innovation. In one aspect, the indexing component 120 can automatically construct ad hoc indexes for cached data sets and query results in form of auxiliary data structures that represent slice indexes 111, 112, 113 (1 thru N, N being an integer—it is to be appreciated that a scenario where a slice index is not created N=0, is also within the realm of the subject innovation). The indexes can be created during query evaluation (or even created proactively before the query arrives). The OLAP system 100 can be associated with the multidimensional database 140, which employs a data model for organizing data that is optimized for data warehouses and data mining applications.

Conceptually, data in the multidimensional database 140 can be stored in cubes defined via multiple dimensions (i.e., three or more) and measures, or tables, rows, and columns in a relational database. Dimensions are cube attributes that describe a similar set of members upon which a user may wish to base analysis. Furthermore, dimension categories or levels can be arranged hierarchically. For example, a time dimension may include levels for year, month, day, hour, and the like. A geography dimension may include levels for country, state, city and the like. Measures are the values, usually numeric, that are aggregated and analyzed.

Moreover, cube space (e.g., virtual cube space) can be defined by the cross product of its dimension attributes and can be extremely large. An attribute to a dimension is akin to what a column is to a table in a relational database. For example, a customer dimension can have attributes such as name, phone number, gender, city, state, and the like. Attributes themselves can be exposed to users via attribute hierarchies. Moreover, a dimension can include a hierarchy that consists of an optional all level and distinct members of the attribute. In the customer dimension example, there could be a name attribute hierarchy with two levels: the all level and a second level with a member for each name.

The slice indexes 111, 112, 113 are derived by the system 100 itself, and in general without being explicitly defined by the query 121 forwarded to the data warehouse 110. In general, the query 121 can implement a high level and declarative (non-procedural) language that typically needs to be translated into a procedural execution plan. The slice indexes 111, 112, 113 can reduce execution time for which such declarative request can be translated into procedural plans, and can further mitigate a requirement of scanning entire tables, which are referenced by the query 121. Hence, costs can be reduced and business value increased.

Such indexing and filtering can substantially reduce response times (e.g., in an order of one or more magnitudes. The indexing component 120 can analyze attributes involved in predicate conditions of filter requests—which are issued on the cached dataset—to form slice indexes for same filtering criteria (e.g., resulting data set share the same filtering criteria in form of attributes such as data, product name, and the like). Moreover, the indexing component 120 can further flush the created index data structures and/or resulting data sets from the cache based on usage patterns and memory availability. The indexes can also be stored in the memory in accordance with a plurality of compression methods (e.g., delta compression).

Figure 2:
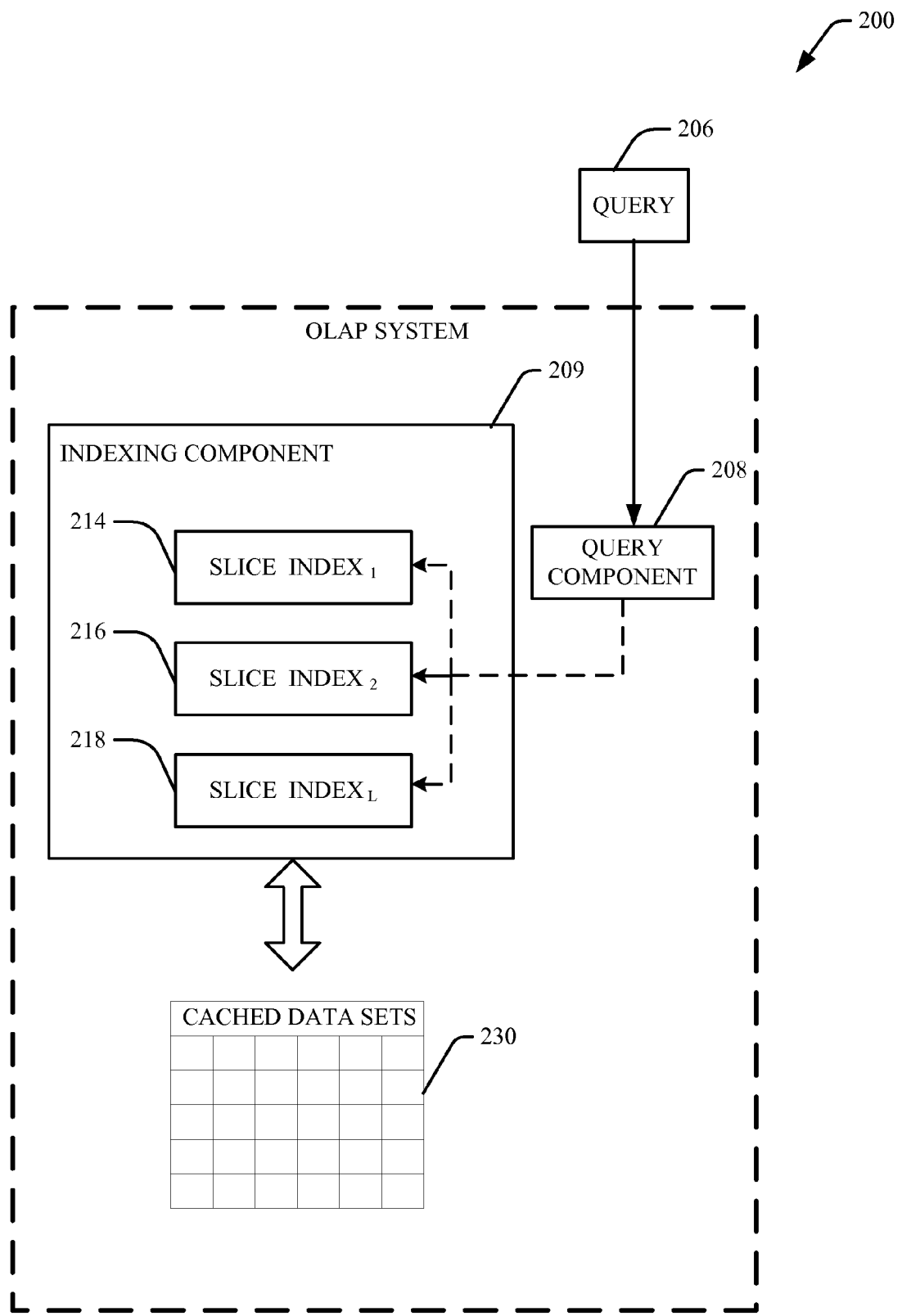
FIG. 2 illustrates a further block diagram for an exemplary OLAP system that employs an indexing component in accordance with an aspect of the subject innovation.

FIG. 2 illustrates a related system 200 according to one aspect of the subject innovation, wherein a query component 208 can extract query predicates from the query 206, to facilitate generation of the slice indexes 214, 216, 218 (1 thru L, where L is an integer.) For example, a predicate can be an expression that asserts a fact about values. If such expression evaluates to TRUE, then the associated condition is satisfied.

Otherwise, and if the expression evaluates to FALSE, then the condition is not satisfied. The query component 208 can receive and execute statements in form of multidimensional query languages for referencing cells in multiple dimensions (e.g., more than two). For example, statements can be specified in MultiDimensional eXpressions (MDX).

In general, MDX is a syntax that supports the definition and manipulation of multidimensional objects and data thereby facilitating the access of data from multiple dimensions easier and more intuitive. MDX is similar in many ways to the SQL (Structured Query Language) syntax (but is not an extension of the SQL language). As with an SQL query, each MDX query requires a data request (the SELECT clause), a starting point (the FROM clause), and a filter (the WHERE clause). These and other keywords provide the tools used to extract specific portions of data from a cube for analysis. MDX also supplies a robust set of functions for the manipulation of retrieved data, a way to define calculated measures, as well as the ability to extend MDX with user-defined functions. Hence, MDX can facilitate customization via business rules.

The indexing component 209 can further analyze incoming data to derive additional predicates therefrom (e.g., examining query contexts). The slice indexes 214, 216, 218 can be automatically derived by the system 200 itself for cached data sets 230, and without being explicitly defined by the users within a query forwarded to the data warehouse. Moreover, the subject innovation can employ forward-only iteration over the index keys, retrieving measure data from the base dataset (e.g., mitigating result materialization and cache registration associated with conventional systems.)

Figure 3:
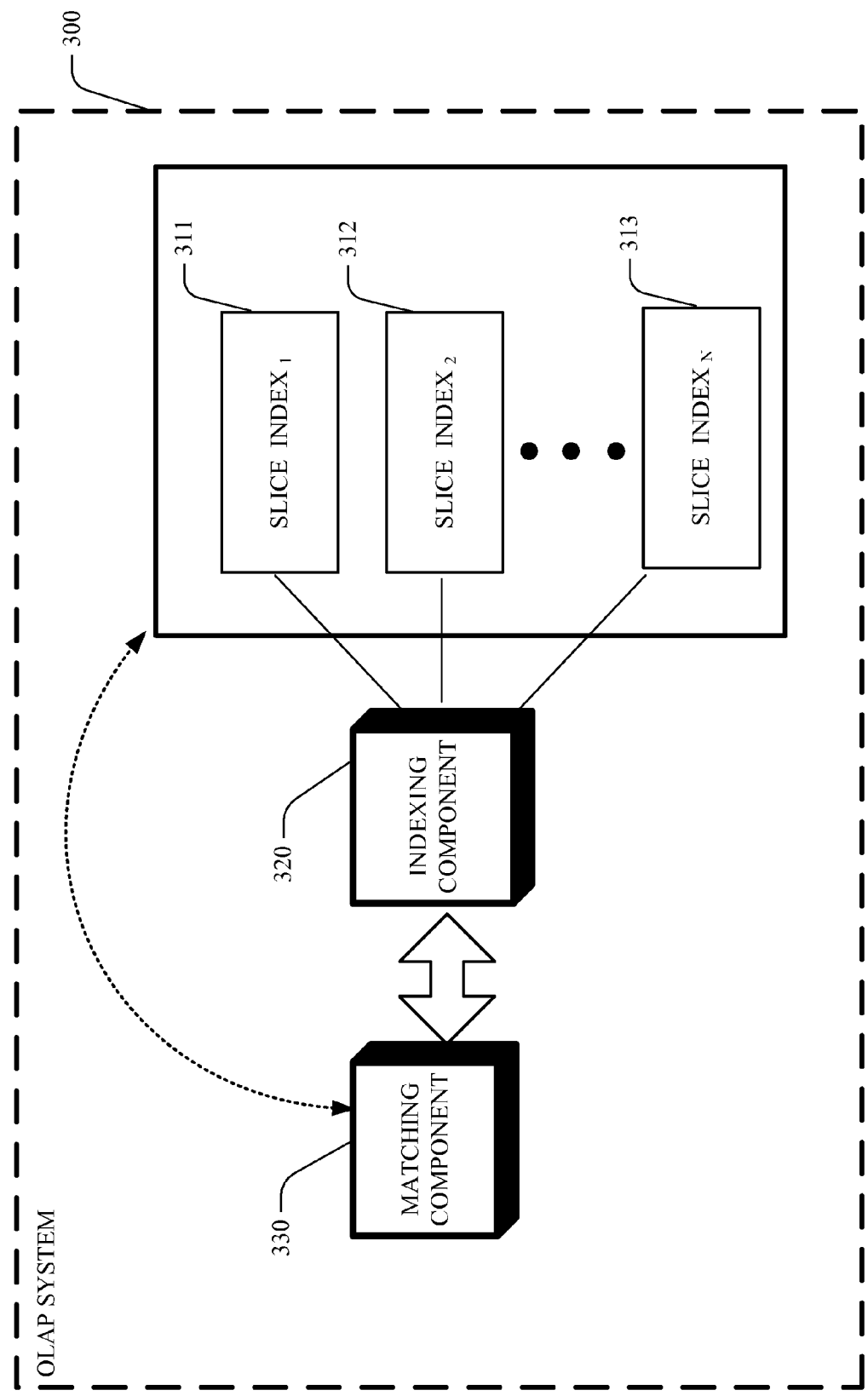
FIG. 3 illustrates a related block diagram for an OLAP system that incorporates a matching component in accordance with an aspect of the subject innovation.

FIG. 3 illustrates a related block diagram for an OLAP system 300 that incorporates a matching component 330 and an indexing component 320 as part thereof. Such matching component 330 matches filtering criteria to an already constructed index data structure such as slice indexes 311, 312, and 313. The matching component 330 examines the already constructed slice indexes 311, 312, 313, and determines the best match for the filtering criteria. If such match is not available, an indexing slice for the filter can then be created, wherein when filtering requests involve multiple candidate keys, then multiple indexes are built on-demand to satisfy the requests (e.g., up to a limit based on heuristics involving cardinality estimates and available memory.)

Accordingly, each of the slice indexes 311, 312, 313 can associate with a particular filtering criteria and a particular selection predicate. Each slice index can be optimized for filtering by a particular attribute in the indexing space (e.g., dates, products, or a combination of multiple attributes). For example, when requests are initially transformed to simpler requests, the matching component 330 can perform a cache lookup to verify whether related slice indexes already exists.

If slice indexes are available, they can be employed to derive a final result from existing cache elements. Hence, when similar queries subsequently appear, the related index structure can be identified, to facilitate retrieval of required data (e.g., from existing cache), and mitigate a requirement to store redundant data, such as storing the subset of data. Even if a match exists, the matching component 330 can decide to create a slice index. Put differently, the matching component can further determine if an existing slice should be employed or whether a slice should be created (e.g., what slice index to build, employ, or how to navigate existing slice indexes, based on cost/benefit analysis, or prior history of requests, or anticipation of future requests or a combination thereof.)

A further aspect of the subject innovation provides for navigation of a slice index (e.g., 214, 216, 218 in FIG. 2 or 311, 312, 313 in FIG. 3). As such, cost estimation can be employed to select amongst several possible navigation methods, and the lowest cost navigation method subsequently chosen and employed. As an example to illustrate navigation method selection, the cost of each method can initially be estimated, and the lowest cost method can subsequently be chosen. Typically, the simplest and cheapest is when the query 206 has a single predicate value (e.g. color=red). When the query 206 has a set of predicate values, there are more choices for how to navigate and the least cost method can be chosen. An example query is ((color=red or blue or green) and (country=USA or Canada)). It is to be appreciated that the queries can be more complex than predicates, including restricting the rows based on security privilege by the user who initiates the query. Such can be handled by further extending the navigation method to filter the output of the indexing component. Moreover, it is to be appreciated that such navigation method can further be extended in many other possible ways, such as to perform calculations on each row in the cached data sets 230.

For example, outer join navigation method iterates over the predicate condition values from the query 206, and employs each value respectively to return the set of records in the cached data sets 230. Accordingly, the outer join navigation method can probe for the Cartesian product of the attribute sets, in this case six key set probes. The cost can be estimated as proportional to the number of keys in the Cartesian product. Typically, a hash table can be chosen to represent the slice index key values, resulting in a constant per-value lookup cost for the outer join method, yet the per-value cost is more expensive than iterating over the slice index key values. The cost estimate can include an extra per-lookup cost from 1% to 10% to account for the difference, for example.

According to a further example, inner join navigation method iterates over the distinct key set in the slice index, and checks each key set for inclusion in the query 206. Such method can create an auxiliary data structure to reduce the cost of checking for set membership, so the cost estimate needs to account for building this data structure. Such can have a cost model as linearly proportional to the number of distinct key values in the slice index, with a per-value cost expected to be in the range of 1.5 to 20 times the lookup cost employed for the outer join method. It is to be appreciated that there can exist variation in the various factors described supra, due to method and details of implementation, for example. According to a further example, distinct keys in the sliced index can be arranged in alternative ways, such as K-D tree to allow alternative navigation methods.

Figure 4:
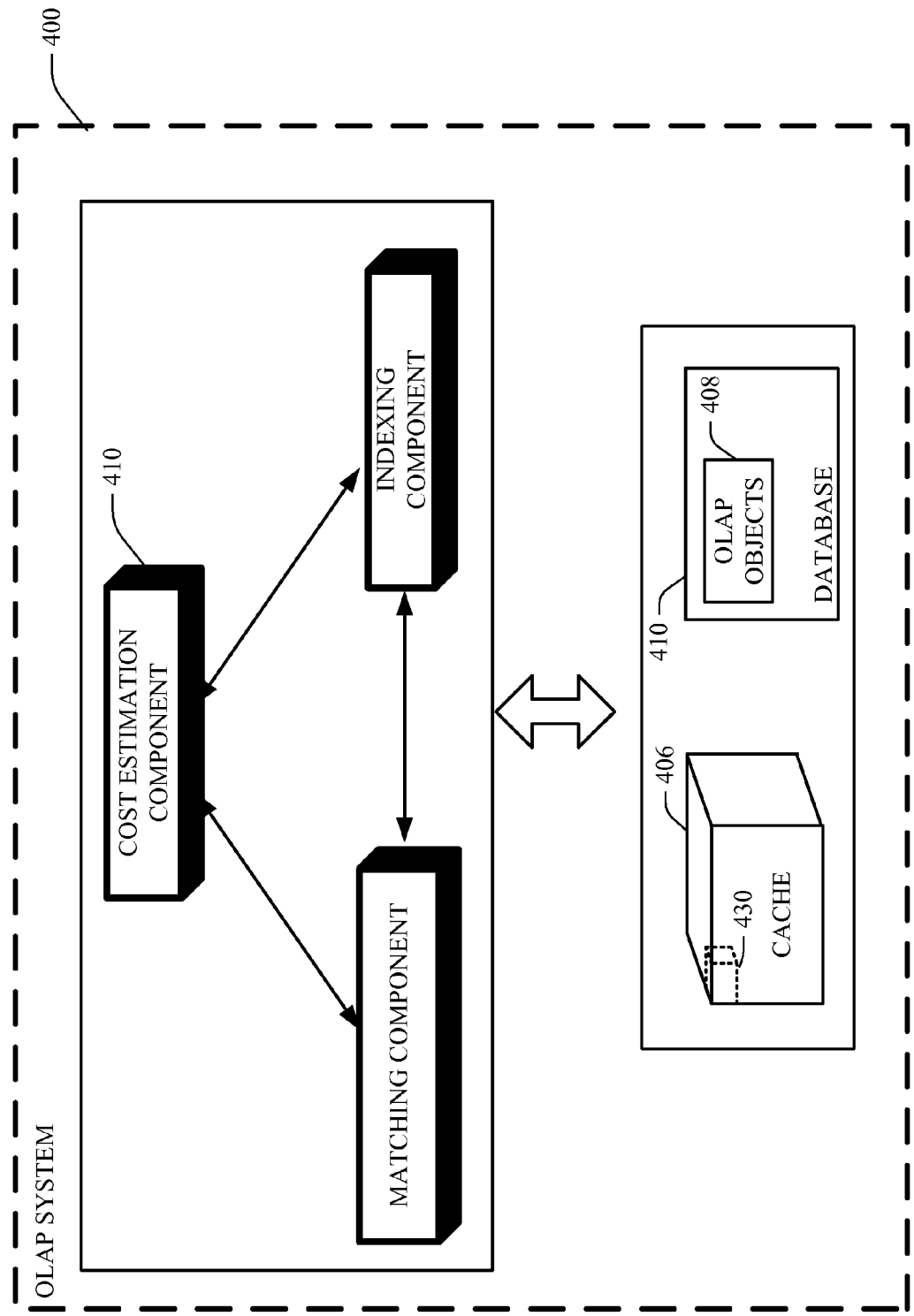
FIG. 4 illustrates a further aspect of the subject innovation wherein the OLAP system employs a cost estimation component to efficiently manage filter creation processes in an OLAP system.

FIG. 4 illustrates a further aspect of the subject innovation wherein the OLAP system employs a cost estimation component 410 to efficiently manage filter creation processes in the OLAP system 400. For example, when using an ad hoc index for filtering by multiple values, if the number of filter predicate conditions is small compared to the number of distinct hash index keys, then the predicate condition values are considered one by one, and each value is used to look up and return corresponding index entries matching the value. As illustrated in FIG. 4, the OLAP system 400 consists of caching system 406, multidimensional objects 408, such as "OLAP objects" and the like, and a database 410. The caching system 406 can include an analysis component (not shown) and a cache subset 430. The OLAP system 400 can supply analysis for a query and response to users via the cache system 406. It is to be appreciated that cache coherency and consistency requirements in relational databases—such as cache invalidation to provide results to users consistent with the source database (e.g., corresponding to a relative clock)—can affect operation of the caching system 406.

Figure 5:
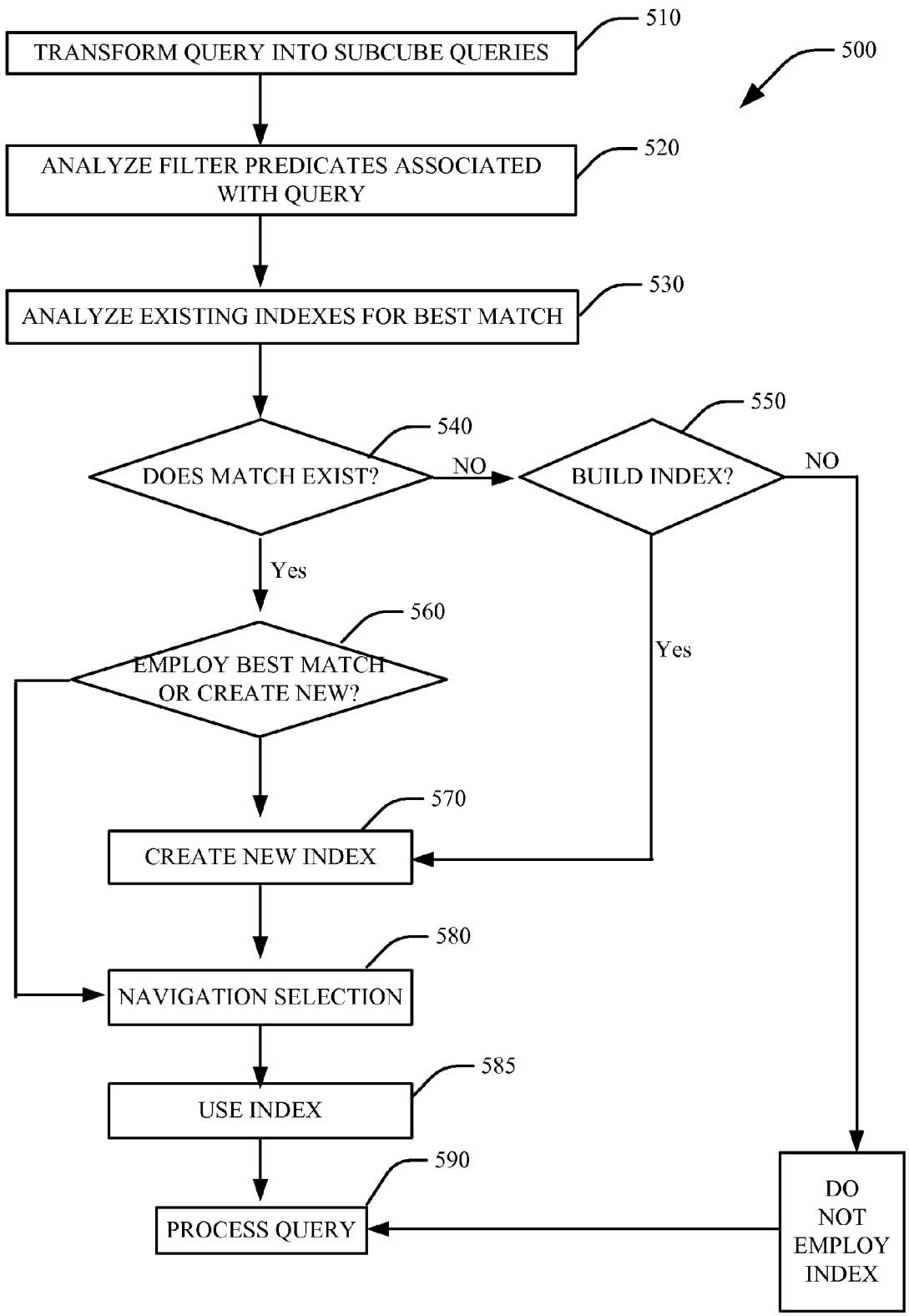
FIG. 5 illustrates a methodology of constructing ad hoc indexes in OLAP environment in accordance with an aspect of the subject innovation.

FIG. 5 illustrates a methodology 500 of constructing indexes in a query retrieval system (e.g., OLAP environment) in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 510 a received query (e.g., in an OLAP system) can be broken up into a plurality of primitives and subcube queries, to analyze filter predicates associated therewith y at 520. Next, and at 530 existing indexes are analyzed to determine whether a match exists at 540 (e.g., an exact match). If not, the methodology 500 proceeds to act 550 where a determination is made as to whether an index should be built. Hence, if no index is to be built, the query can be processed at 590 without employing indexes.

Alternatively, if a match exists at 540, then a determination can be performed at 560 to verify whether such best match is to be employed or an index should be created at 570. At 580 a navigation selection is employed to allow further operational efficiency (e.g., via a navigation selection component.) In either case, indexes can then be employed at 585 to process the query at 590. It is to be appreciated that queries can also be batched together, wherein a plurality of concurrent cache request can then be analyzed together, to increase operation efficiency.

Figure 6:
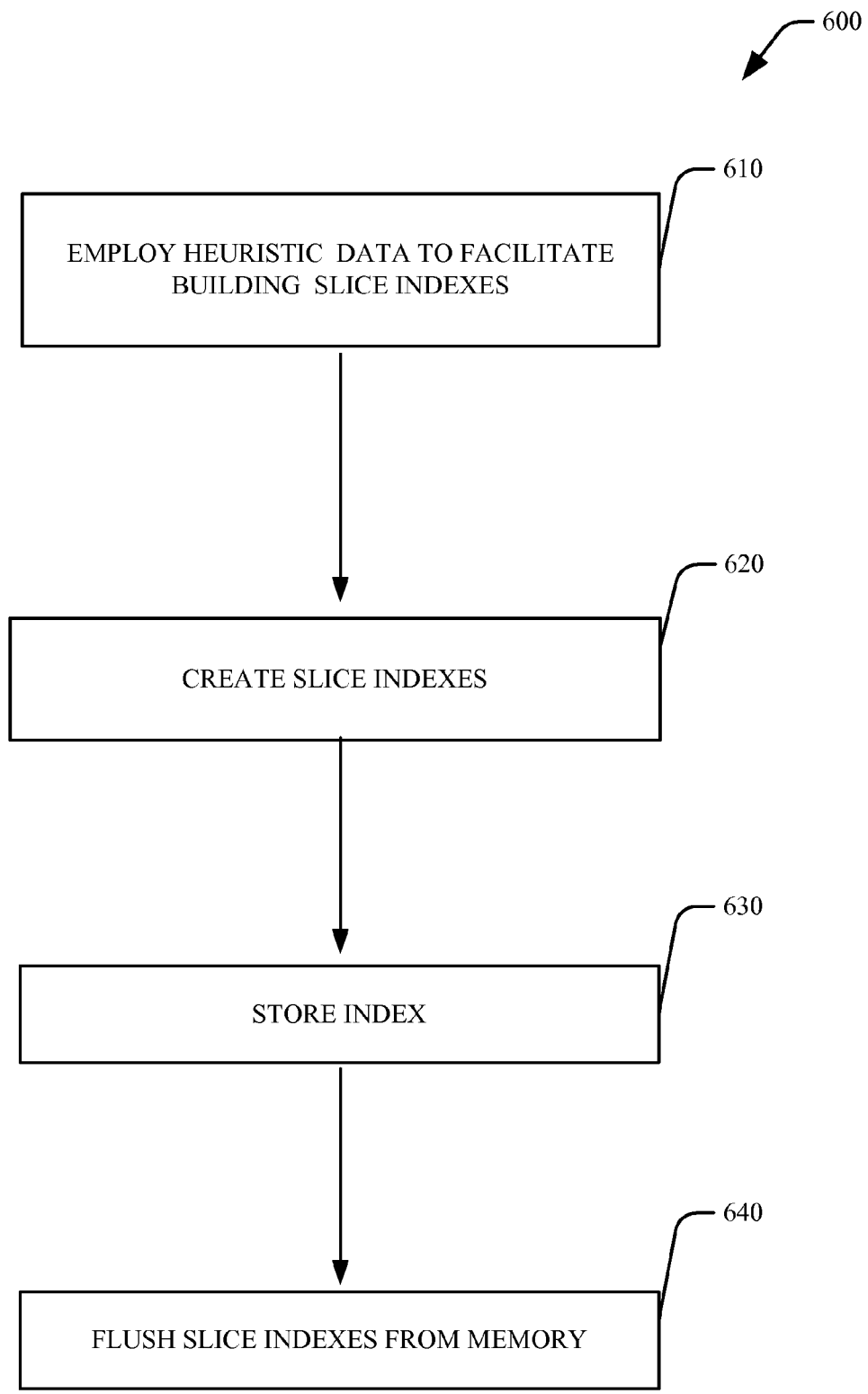
FIG. 6 illustrates an exemplary methodology of creating slice indexes in accordance with an aspect of the subject innovation.

FIG. 6 illustrates a related methodology 600 of creating slice indexes for queries in an OLAP environment in accordance with an aspect of the subject innovation. Initially and at 610 heuristic data is employed to facilitate building slice indexes, wherein the decision to build such indexes can be based on data cardinality statistics, and number of filter requests issued on a given dataset with filter predicates based on the same candidate key attributes. Moreover, the decision of building an index for a dataset can be performed by the MDX Query Processor and Query Optimizer, e.g., when they can infer and have advance knowledge that executing a given MDX query will require multiple filtering operations to be made on the same dataset with predicates based on the same candidate key criteria. Next, and at 620 the slice indexes are created and stored at 630. It is to be appreciated that decision to create indexes can be based on various cost estimation scenarios, such as if the number of rows are below a predetermined threshold (e.g., number of rows below 100). Moreover, a list of indices in to the data cache can be attained in sorted order and delta compression techniques can be employed to store such list.

Accordingly, each of the slice indexes can be associated with a particular filtering criteria and a particular selection predicate. It is to be appreciated that each slice index can further be optimized for filtering by a particular attribute in the indexing space (e.g., dates, products, or a combination of multiple attributes). Next, and at 640 the slice indexes can be flushed from the cache based on usage patterns (or prediction of usage patterns) and memory availability.

Figure 7:
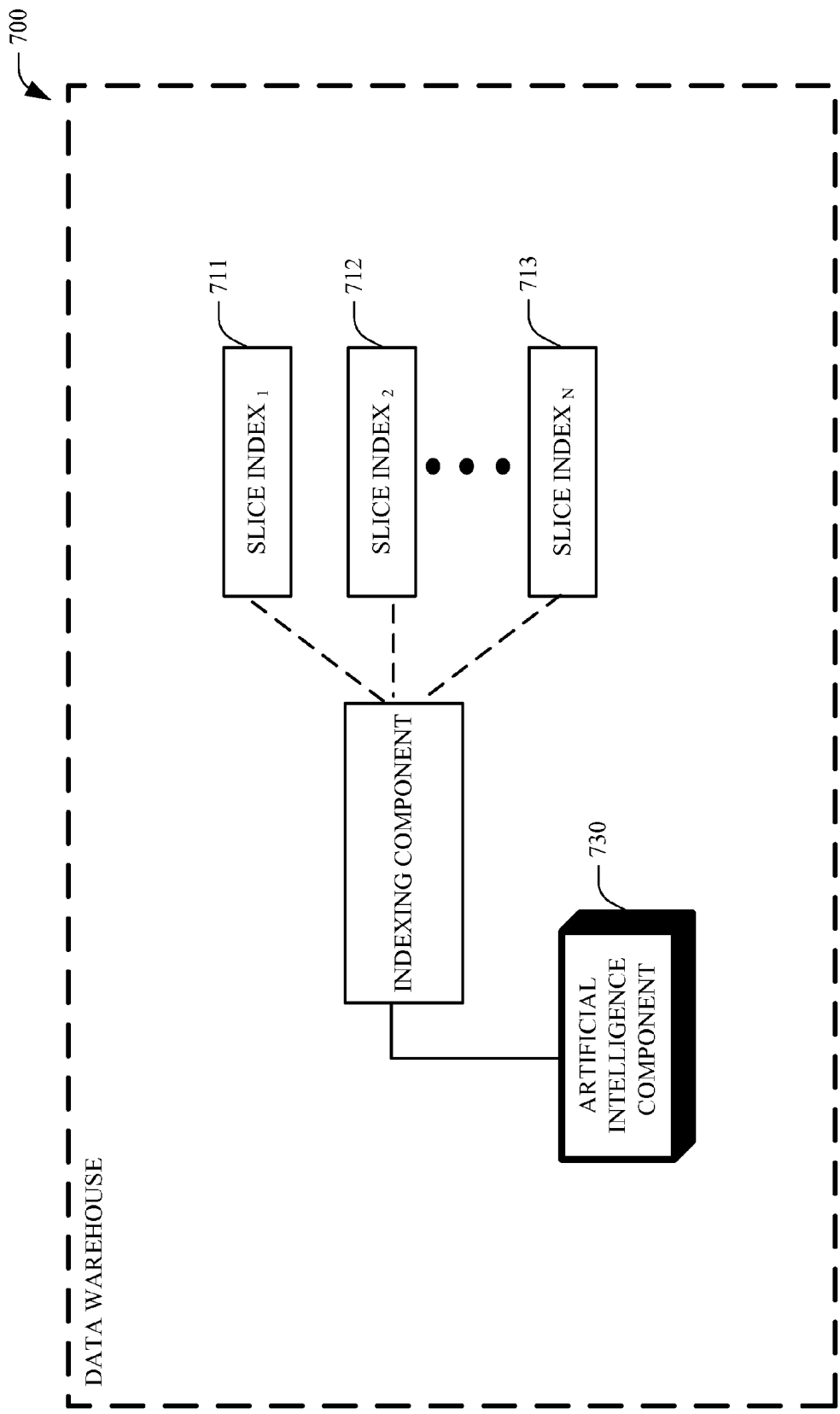
FIG. 7 illustrates an artificial intelligence component that can interact with an indexing component to process queries in accordance with an aspect of the subject innovation.

FIG. 7 illustrates an artificial intelligence (AI) component 730 that can be employed to facilitate inferring and/or determining when, where, how to create slice indexes 711, 712, 713 in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 730 can employ any of a variety of suitable AI-based schemes as described supra in connection with facilitating various aspects of the herein described invention. For example, a process for learning explicitly or implicitly whether an index should be created can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$. In a related aspect, the machine learning technique of voting amongst independent trend prediction methods can also be employed in conjunction with the subject innovation.

Figure 8:
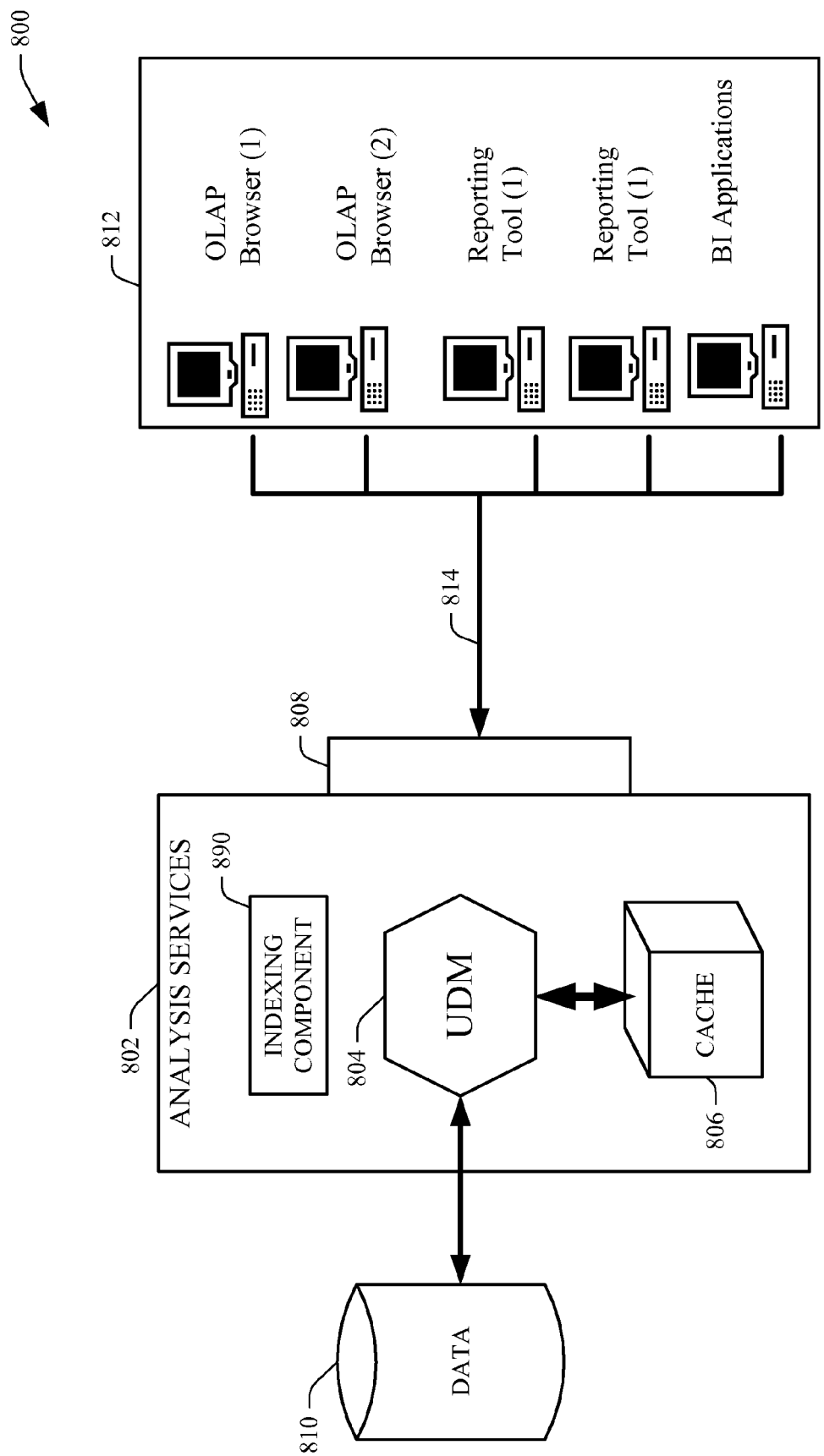
FIG. 8 illustrates a block diagram for analysis services in accordance with a particular aspect of the subject innovation.

FIG. 8 illustrates a further block diagram 800 that includes an indexing component 890 in accordance with an aspect of the subject innovation. This typical environment 800 comprises an analysis services component 802 linked to a data source 810 and user interfaces 812. The user interfaces 812 are comprised of OLAP browsers, reporting tools, and other BI (Business Intelligence) applications and the like. The analysis services component 802 typically has an interface 814 with the user interfaces 812 via interfaces 808 like XML/A (eXtensible Markup Language/Analysis) and MDX (Multidimensional Exchange Language) and the like. The analysis services component 802 is comprised of a UDM (Unified Dimensional Model) component 804 and a cache 806.

In this example, the indexing component 890 can be part of the analysis services component 802, and interact with the UDM component 804 and the cache 806. The UDM component 804 can proactively access the cache 806 and/or the data directly. Such indexing component 890 analyzes attributes involved in predicate conditions of filter requests—which are issued on the cached dataset—to form slice indexes for same filtering criteria (e.g., resulting data set share the same filtering criteria in form of attributes such as data, product name, and the like).

Accordingly, overall efficiency for queries that require multiple filtering operations on a large dataset is improved, (e.g., improved speed of data filtering/selection and decreased memory usage for the cache system.) Moreover, system resources such as memory capabilities can be efficiently employed to provide system access for a wider group of audience (e.g., busy executives), wherein the indexes are created on-the-fly (typically without intervention by system administrators), and while users await obtaining results for submitted queries. It is to be appreciated that FIG. 8 is exemplary in nature and the indexing component 890 can also be part of a user layer.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
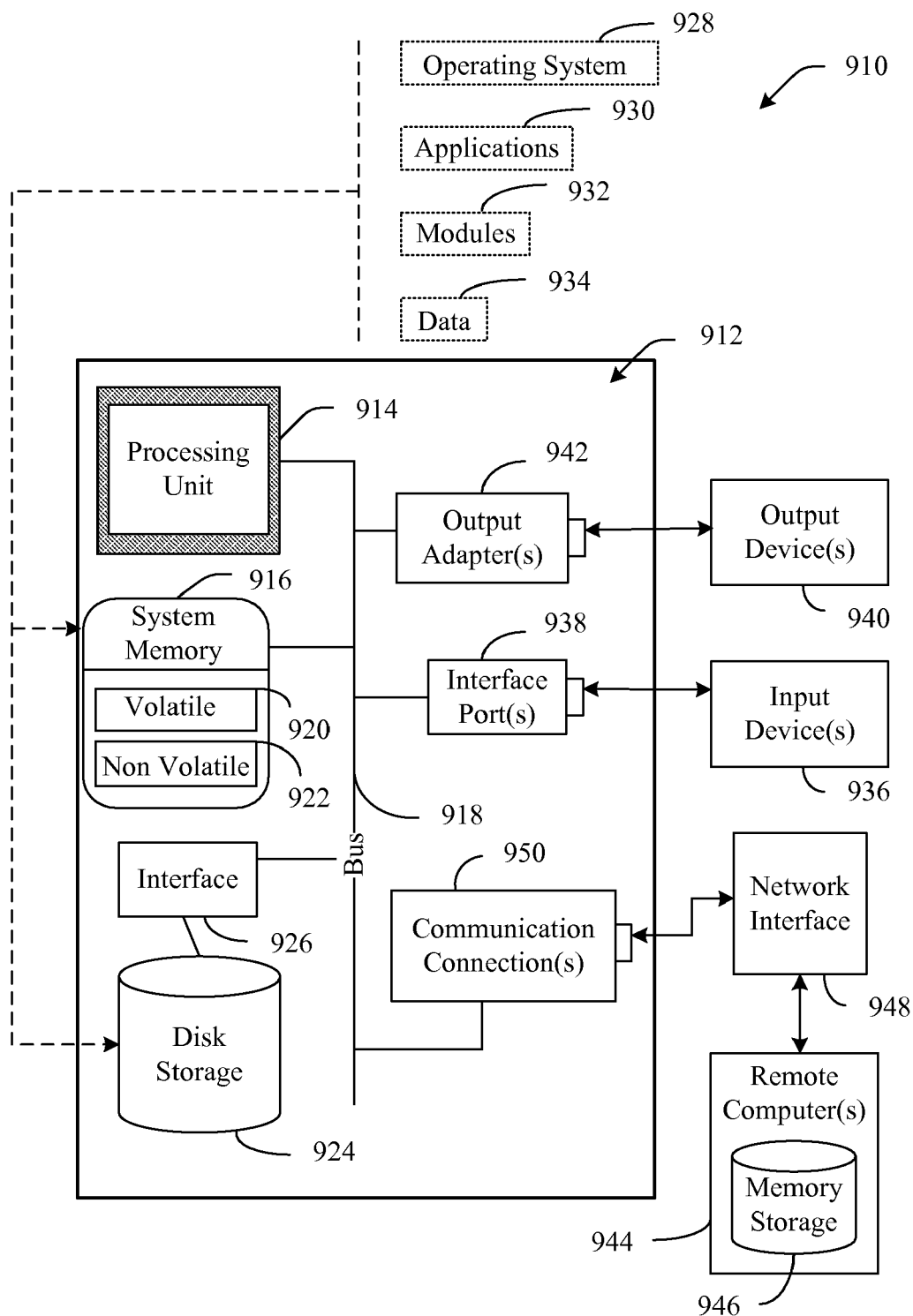
FIG. 9 illustrates an operating environment that can implement various aspects of the subject innovation.
Figure 10:
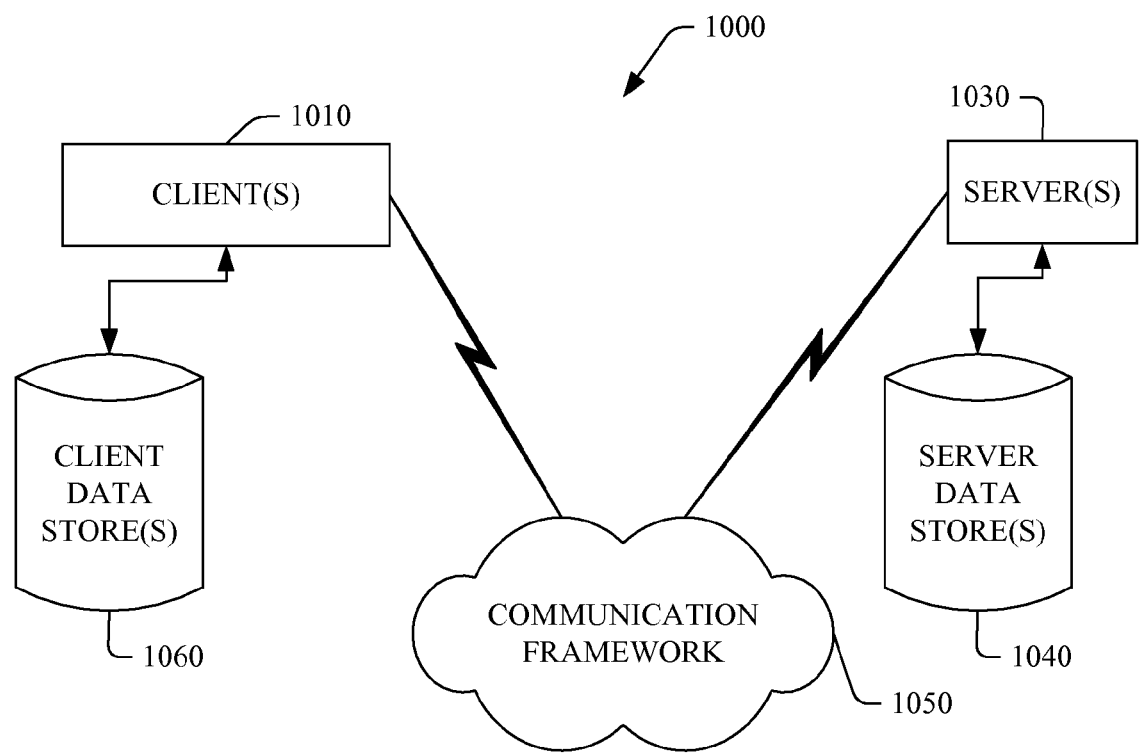
FIG. 10 illustrates a further schematic block diagram of a suitable operating environment for implementing various aspects of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types.

Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936.

Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of an indexing arrangement in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer program product comprising one or more computer readable storage media upon which computer executable instructions are encoded, the instructions when executed upon one or more computer processors providing for one or more components comprising:
an indexing component that
receives a query in a query retrieval system;
extracts query predicates from the query;
subdivides the query into a plurality of sub requests;
analyzes attributes associated with predicate conditions of the query;
determines that a slice index is to be generated for filtering criteria of the attributes associated with the predicate conditions, wherein the slice index is associated with a data set of the retrieval system associated with filtering criteria similar to that of the query;
automatically derives and generates a slice index associated with the predicate conditions;
optimizes the slice index for filtering by a particular set of attributes in an indexing space;
stores the generated slice index in an auxiliary data structure for future use; and
performs a cache lookup to verify whether the stored slice index is related to a second query;
determines whether the stored slice index is a best match for the second query;
when the stored slice index is a best match for the second query, re-uses the slice index in association with the second query; and
when the stored slice index is not a best match for the second query, creates another slice index for filtering criteria associated with predicate conditions from the second query, wherein when the filtering criteria associated with the predicate conditions from the second query involve multiple candidate keys, then multiple indexes are built on-demand to satisfy the second query up to a limit based on heuristics involving cardinality estimates and available memory.

2. The computer program product of claim 1 further comprising a matching component that matches a filtering criteria to the slice index.

3. The computer program product of claim 1 further comprising a cost estimation component that evaluates creation of the slice index.

4. The computer program product of claim 1 further comprising an artificial intelligence component that facilitates generation for the slice index.

5. The computer program product of claim 2 further comprising a navigation selection component.

6. The computer program product of claim 3, the slice index further comprising a hash index.

7. The computer program product of claim 1 further comprising a multidimensional expression (MDX) Query that infers indexes to be created.

8. The computer program product of claim 1 further comprising a cache with coherency requirements related to an associated database.

9. The computer program product of claim 8, the slice index flushable through the cache.

10. The computer program product of claim 1, the query retrieval system is an online analytical processing (OLAP) environment.

11. A computer implemented method comprising the following computer executable acts:
receiving a query in a query retrieval system;
subdividing the query into a plurality of sub requests;
determining one or more predicates by examining the query;
determining that a slice index is to be generated for filtering criteria of attributes associated with the one or more predicates, wherein the slice index is associated with a data set of the retrieval system associated with filtering criteria similar to that of the query;
automatically deriving and generating the slice index from the one or more predicates;
optimizing the slice index for filtering by a particular set of attributes in an indexing space; and
storing the slice index in an auxiliary data structure; and
performing a cache lookup to verify whether the stored slice index is related to a second query;
determining whether the stored slice index is a best match for the second query;
when the stored slice index is a best match for the second query, re-using the slice index in association with the second query; and
when the stored slice index is not a best match for the second query, creating another slice index for filtering criteria associated with predicate conditions from the second query, wherein when the filtering criteria associated with the predicate conditions from the second query involve multiple candidate keys, then multiple indexes are built on-demand to satisfy the second query up to a limit based on heuristics involving cardinality estimates and available memory.

12. The computer implemented method of claim 11 further comprising predicting the query.

13. The computer implemented method of claim 11 further comprising selecting a navigation of indexes based on cost estimation.

14. The computer implemented method of claim 13 further comprising selecting a navigation method.

15. The computer implemented method of claim 13 further comprising verifying existence of an exact match for the index.

16. The computer implemented method of claim 11 further comprising retrieving data from cache via the index.

17. The computer implemented method of claim 15 further comprising employing cardinality statistics to create the index and a compression technique for storage thereof.

18. The computer implemented method of claim 11 further comprising flushing the index from cache.

19. The computer implemented method of claim 11 further comprising creating the index based on a cost estimation analysis.

* * * * *